United States Patent [19]
Lindeman

[11] 3,871,152
[45] Mar. 18, 1975

[54] SPRING FASTENER

[75] Inventor: Richard Jay Lindeman, Elmwood Park, Ill.

[73] Assignee: Illinois Tool Works Inc., Chicago, Ill.

[22] Filed: Oct. 29, 1971

[21] Appl. No.: 193,763

[52] U.S. Cl. ................................. 52/543, 85/49
[51] Int. Cl. ........................................ F16b 15/00
[58] Field of Search .............. 85/49, 28, 11, 13, 15, 85/17; 52/543, 548, 520, 521

[56] References Cited
UNITED STATES PATENTS

| | | | |
|---|---|---|---|
| 249,850 | 11/1881 | McGill | 85/49 |
| 1,321,623 | 11/1919 | Griswold | 85/49 |
| 1,385,809 | 7/1921 | Abraham | 52/543 |
| 1,491,673 | 4/1924 | Cockbaine | 85/49 |
| 1,538,235 | 5/1925 | Bell et al. | 52/548 |
| 1,613,156 | 1/1927 | Bergner | 52/548 |
| 2,057,003 | 10/1936 | Bugher | 85/28 |
| 2,287,843 | 6/1942 | Turzicky | 85/13 |
| 2,382,474 | 8/1945 | Gambo | 85/11 |
| 2,391,792 | 12/1945 | Miles et al. | 52/543 |
| 3,128,667 | 4/1964 | Tremblay | 85/49 |
| 3,373,646 | 3/1968 | Ehlert | 85/49 |

FOREIGN PATENTS OR APPLICATIONS

| | | | |
|---|---|---|---|
| 121,628 | 12/1958 | U.S.S.R. | 85/49 |
| 328,332 | 4/1958 | Switzerland | 85/49 |

*Primary Examiner*—Marion Parsons, Jr.
*Attorney, Agent, or Firm*—Robert W. Beart; Thomas W. Buckman

[57] ABSTRACT

A fastener device for attaching shingles or other roofing material to a support service. The fastener includes a cantilevered spring member formed as the head of the fastener and extending generally perpendicular to the axis of a leg portion. As wind, or other external forces, tend to disassociate the shingle or roofing from the support member, the spring member on the fastener resiliently resists such upward movement.

6 Claims, 12 Drawing Figures

SPRING FASTENER

BACKGROUND OF THE INVENTION

This invention relates generally to a fastening device, such as a nail or staple, and more particularly to a device uniquely configured to attach shingles or roofing to a support surface.

The attachment of a shingle or other roofing material to a support surface, such as plywood or the like, has generally been accomplished by a roofing nail which includes a circular head having a wire-like entering leg portion. While the use of such a fastener is somewhat effective in this environment, wind and other outside forces still tend to pull a shingle or roofing material over the head with such force that the material is torn or ripped from under the fastener. The use of ordinary wire or stamped staples presents similar tear-out problems.

The increasing use of composition materials, such as gypsum board, as a substitute for construction materials, such as plywood, presents additional problems when using the above mentioned prior art fasteners in attaching shingles or the like to such gypsum board used as the support surface. The use of an ordinary wire roofing nail will tend to spall the gypsum board thus appreciably decreasing the surface contact within the board and obviously decreasing the resistance to pull out of the fastener in the board. This deficiency, coupled with the normal deficiencies of the roofing nail to prevent tearing of the roofing material and minimize the tendency of a shingle to pull over the fastener when the roof is exposed to a relatively strong wind, makes such fasteners inadequate.

SUMMARY OF THE INVENTION

It is an object of this invention to provide a fastener which efficiently decreases the tendency of roofing material or shingles to pull over a fastener to such an extent that the roofing material is torn and disassociated from a support surface.

It is a further object of this invention to provide a fastener which is particularly adapted to attach roofing or shingles to a gypsum board support surface.

It is yet another object of the invention to provide a fastener which resiliently absorbs the pull back or pull over motion of a shingle.

These and other objects and advantages of the present invention are attained by a fastener device having a leg portion or portions and a head portion which is in a plane generally perpendicular to the leg portion and extending laterally therefrom. The head portion includes a spring-like member cantilevered from the leg portion to resiliently resist and absorb the energy and motion of a shingle or roofing material as it tends to pull over the fastener as a result of wind forces thereon. The quality of the fastener may further be enhanced by providing the leg portions with a thin, flat cross-sectional area to aid the insertion of the fastener in material such as gypsum board, as well as minimizing the possibility that the roofing material will tear loose from beneath the fastener. The fastener may advantageously be constructed of either a stamping or a wire.

A BRIEF DESCRIPTION OF THE DRAWINGS

Other objects and advantages of the invention will become apparent upon reading the following detailed description, and upon reference to the drawings in which FIG. 1 is a perspective view of the preferred embodiment of the fastener which is the subject matter of the present invention.

DETAILED DESCRIPTION OF THE INVENTION

Figure 1:
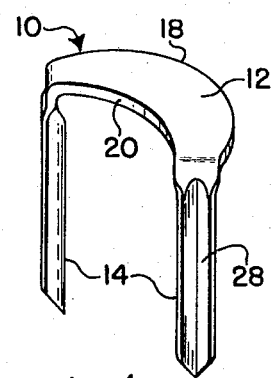

Referring to FIG. 1 of the drawings, a fastener member 10 is shown as a staple-like member including a pair of legs 14 integrally connected by a crossbar or head 12.

Figure 3:
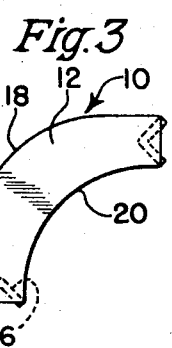
FIG. 3 is a top plan view of the staple shown in FIG. 2.
Figure 2:
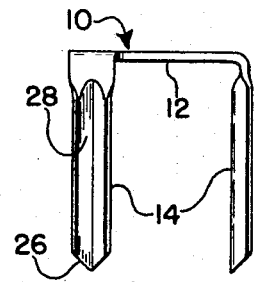
FIG. 2 is a side elevation view of the preferred embodiment of the invention.

The head portion 12 is advantageously formed and adapted to function as a cantilever-type spring member. As shown in FIGS. 2 and 3, the head portion 12 extends in a plane generally perpendicular to the plane which includes the longitudinal axes of the leg portions 14. The spring-like head 12 is also shown to lie entirely on one side of this plane which includes the longitudinal axes of the legs and presents a front edge 18 which is adapted to distribute the contact between a shingle and the fastener head. The head portion and legs are thus uniquely designed to allow the head to resiliently pivot, in the manner of a cantilever spring, about a horizontal axis.

Figure 4:
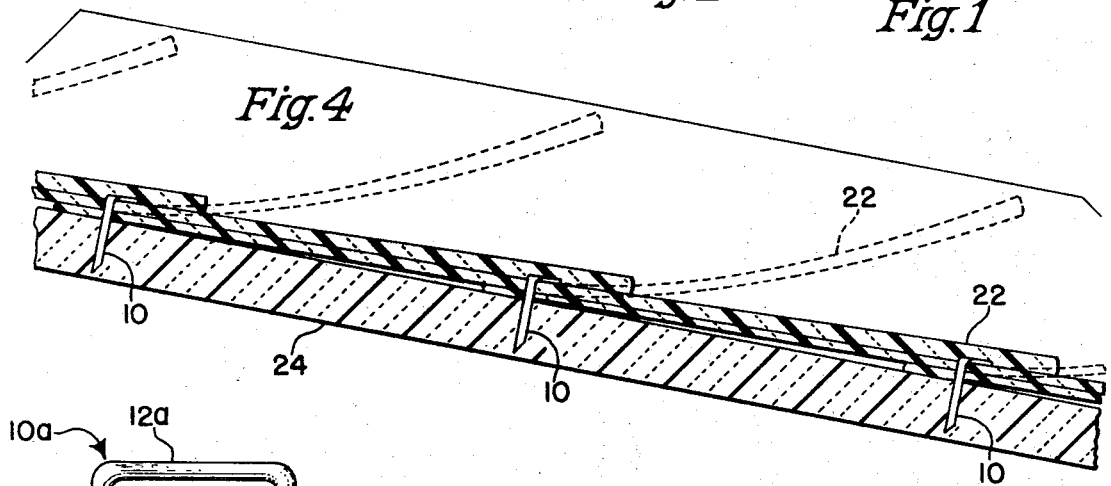
FIG. 4 is a side elevation view showing the use of the spring fastener in an environment in which shingles are attached to a support surface.

One of the applications of the fastener of the present invention is the attachment of roof shingles to a support surface. In FIG. 4 a typical application of this type is illustrated in which a series of shingles 22 are attached to a support surface 24. The fastener 10 is shown to be applied to a shingle towards the upper edge of the shingle, with the lower edge being relatively free to flex about the joint. The shingles 22 are also shown in a dotted line configuration representing the position of a shingle as it tends to pull over the fastener as a result of wind forces on the roof.

Figure 5:
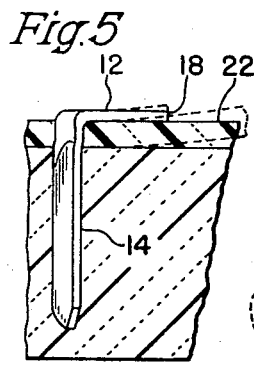
FIG. 5 is a detailed view of one of the fasteners shown in FIG. 4.

As best shown in the detailed FIG. 5, the extending spring-like head 12 tends to flex with the shingle 22. This tends to eliminate the sharp line contact between a shingle and a relatively inflexible fastener head. The ability of the head 12 to resiliently absorb the upward motion of the shingle thus tends to eliminate one of the major problems encountered in roofing applications. In actual practice, the spring portion 12 may be preformed to extend downwardly at a slight angle to the horizontal plane to provide an initial spring force to the system.

Further resistance to the tendency of shingles or roofing material to tear is provided by a front edge which distributes the upward force of the shingle over a relatively large area. The curved edge 18, shown on fastener 10, serves to effectively distribute force concentrations upon normal flexing of the shingle, as shown in FIG. 4.

An additional problem involved in attaching shingles or other roofing material directly to a support surface of a gypsum board type is the difficulty of driving a fastener in such a board without spalling or deteriorating the underside of the board. The staple 10 described above is uniquely designed to eliminate this problem. It should be noted that the legs 14 are formed with a relatively thin planar cross-sectional area. This allows the fastener to penetrate into a gypsum board type of support and shear the gypsum material rather than axially displacing material, as generally occurs, even when a relatively sharp point is used on a shank of relatively large cross-sectional area. In addition, the flat surfaces, such as 16, shown in FIG. 3, serve to provide a large surface contact area with the gypsum board thus increasing the frictional resistance to pull out of the fastener. The flat surface of the legs may also be advantageously positioned or configured to face the same direction as the spring-like head member 12. This flat or blunt surface thus aids in preventing the shingle material from tearing as forces are applied in the direction of the arrow A in FIG. 1.

Figure 8:
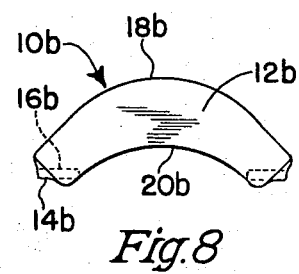
FIG. 8 is a top plan view of yet another embodiment of the present invention.

While the preferred embodiment of FIGS. 1–3 show legs having reinforced channel-like configurations, it should be apparent that the legs may be formed in a totally flat cross-sectional area such as shown in the alternate embodiment of FIG. 8.

Figure 7:
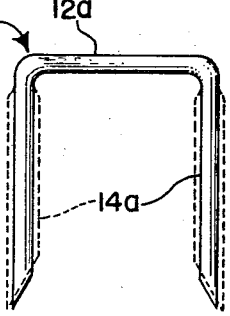
FIG. 7 is a front elevation view of the fastener described in FIG. 6.
Figure 6:
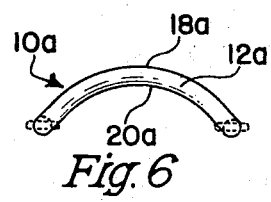
FIG. 6 is a top plan view of another embodiment of the present invention.

FIGS. 6 and 7 illustrate a modified form of the spring fastener constructed from wire stock. In this embodiment, fastener 10a also includes a bow-like spring head 12a integrally connected to depending legs 14a. In keeping with the invention, a curved outer edge 18a and a curved inner edge 20a are provided to the spring-like head 12a.

As in the case of the previous embodiment, the fasteners of FIGS. 6 and 7 may be provided with legs having relatively thin planar cross-sectional area. In this embodiment, the dotted line representation of legs 14a may be produced by swaging or otherwise deforming the round stock.

Figure 9:
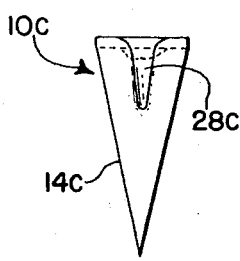
FIG. 9 is an elevation view of another embodiment of the invention which utilizes a single leg.
Figure 10:
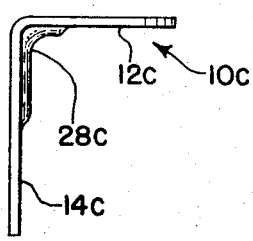
FIG. 10 is a side elevation view of the invention described in FIG. 9.
Figure 11:
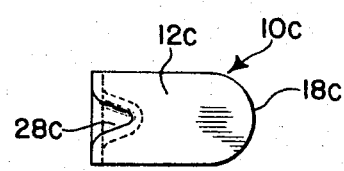
FIG. 11 is a top plan view of the embodiment shown in FIGS. 9 and 10.

FIGS. 9–11 illustrate yet another modification of the invention in which flat, nail-like fastener 10c includes a single leg portion 14c integrally connecting a flat cantilever spring-like head portion 12c. It should be noted that this spring nail also presents a generally curved front edge 18c to resist tearing of workpiece material beneath the fastener. A reinforced rib 28c is provided at the juncture of the spring and the leg portions, and may be calibrated to the desired resiliency of the spring head 12c.

Figure 12:
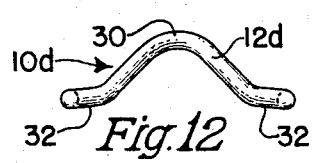
FIG. 12 is a top plan view of still another embodiment of the invention.

In accordance with a further aspect of the invention, FIG. 12 discloses a staple 10d, somewhat similar to the wire staple described with reference to FIGS. 6 and 7. The staple 10d includes a spring head 12d which incorporates a laterally extending bow-like portion 30 with a pair of bar-like members 32 extending inwardly from legs 14d and positioned in the plane, including the longitudinal axes of the legs. The bar members 32 act as a torsion spring to resiliently resist the upward movement of an associated workpiece.

The staples configured in accordance with the invention preferably include a rear edge 20 having a configuration complementary to the front edge 18. Thus, a sharp straight line is not present at the pivoting axis which will tend to bite in or transmit the spring energy of the head portion 12 directly to the shingle or roof material. The use of complementary configured front and rear edges also simplifies the manufacturing and collation of devices having laterally extending front edges.

Thus it is apparent that there has been provided in accordance with the invention a fastening device which uniquely includes cantilevered spring means extending in a plane generally perpendicular to leg or shank portions and is particularly adapted to resiliently absorb upward pull over motion of shingles while minimizing the tendency of the shingle or roofing material to tear out from under such a fastener. While the invention has been described in conjunction with specific embodiments thereof, it is evident that may alternatives, modifications and variations will be apparent to those skilled in the art in light of the foregoing description. Accordingly, it is intended to embrace all such alternatives, modifications and variations as fall within the spirit and broad scope of the appended claims.

I claim:

1. A staple fastener in combination with flexible shingle and a gypsum-like support surface including a head portion on the staple which includes a generally U-shaped cantilever-type spring means and a pair of legs having penetrating points connected thereto, the cantilever spring means engaging and holding one end of the resilient shingle in such a manner as to allow the free end to flex, the cantilever spring means thereby resiliently absorbing forces tending to pull out the staple as well as forces tending to rip the shingle from under the staple, the leg portions being of a relatively thin planar cross-sectional configuration to facilitate entry in the gypsum-like support surface without deteriorating the structure of the gypsum-like support surface.

2. The staple in combination with a shingle and gypsum-like support surface in accordance with claim 1, wherein the head portion is a generally bow-shaped section, the middle portion of this bow-shaped section forming the cantilever spring means while outer portions of the bow-shaped section form torsional spring means.

3. A fastener in accordance with claim 1 wherein the spring means is a flat member integral with the leg portion and projecting horizontally therefrom.

4. A fastener in accordance with claim 1 wherein the spring means includes a curved wire-like cross bar integrally connecting a pair of downwardly depending legs.

5. A fastener in accordance with claim 1 wherein the leg portion includes a pair of workpiece entering legs connected by the driving head portion, the resilient means comprising a strip member having an outer edge and inner edge, both edges being situated on the same side of and offset from a plane including the workpiece entering legs.

6. A fastener in accordance with claim 1 in the form of a staple including a pair of legs integrally connected to the driving head portion, the resilient means comprising a bow-shaped spring member which is adapted to absorb the lifting forces of the workpiece.

* * * * *